United States Patent [19]

Escolar

[11] Patent Number: 4,875,037
[45] Date of Patent: Oct. 17, 1989

[54] AUTOMATIC REROUTING OF CALLS THROUGH DATA BUSES

[75] Inventor: Carlos Escolar, East Windsor, N.J.

[73] Assignee: American Telephone and Telegraph Company, AT&T Bell Laboratories, Murray Hill, N.J.

[21] Appl. No.: 764,775

[22] Filed: Aug. 12, 1985

Related U.S. Application Data

[63] Continuation of Ser. No. 437,814, Oct. 29, 1982, abandoned.

[51] Int. Cl.⁴ .............................................. H04Q 1/00
[52] U.S. Cl. ........................... 340/825.01; 340/825.03; 340/825.16; 370/16; 371/8.2
[58] Field of Search .................. 364/200; 340/825.01, 340/825.03, 825.16, 825.22; 455/8; 371/8, 11; 370/16

[56] References Cited

U.S. PATENT DOCUMENTS

| | | | |
|---|---|---|---|
| 3,859,468 | 1/1975 | Smith et al. ..................... | 179/15 AL |
| 3,864,533 | 2/1975 | Erlund ........................... | 179/175.3 S |
| 4,071,702 | 6/1978 | Charransol et al. ............ | 179/15 AT |
| 4,076,961 | 2/1978 | Holsinger et al. ......... | 340/825.01 X |
| 4,254,496 | 3/1981 | Munter ................................. | 370/16 |
| 4,264,893 | 4/1981 | Hutch .......................... | 340/825.01 X |
| 4,306,313 | 12/1981 | Baldwin ..................... | 179/175.35 X |
| 4,402,082 | 8/1983 | Cope .................................. | 370/16 X |
| 4,455,645 | 6/1984 | Mijioka et al. ............. | 340/825.01 X |
| 4,463,350 | 7/1984 | Kajiura et al. ................. | 340/825.01 |

Primary Examiner—Ulysses Weldon
Attorney, Agent, or Firm—Roy C. Lipton; Ronald D. Slusky

[57] ABSTRACT

A redundant (multiple) bus system for interconnecting a plurality of data source and destination entities and arranged to direct data communications over an alternative bus in the event that a prior call to a destination over a first bus was unsuccessful. Each source entity maintains a table designating a separate logical path over each bus to each destination entity, marking each path designation in accordance with the success or failure of calls directed through the path. The bus selection for delivering a communication to any destination is determined in accordance with designation markings for the paths to the destination and independent of designation markings for paths to other destinations whereby a bus may be selected for a delivery to one destination even though prior deliveries over the bus to other destinations have failed.

7 Claims, 4 Drawing Sheets

AUTOMATIC REROUTING OF CALLS THROUGH DATA BUSES

This is a continuation of application Ser. No. 437,814, filed Oct. 29, 1982 now abandoned.

TECHNICAL FIELD

This invention relates to data bus communication systems and, more particularly, to redundant bus systems for insuring delivery of data communications.

BACKGROUND OF THE INVENTION

Data bus systems are widely used for delivering data communications from one or more source entities to selected ones of a plurality of destination entities which are relatively close in proximity to the source entities. To deliver a data communication to a particular destination in a typical bus system, a source entity will accompany the communication with address code designating the desired destination and then direct the address code and the data to the bus for distribution in parallel to all the destinations on the bus. The addressee destination entity, upon identifying its own address code on the bus, accepts the data and advantageously returns an acknowledgement to the sender that the communication has been accepted.

A bus system of the above-described type is disclosed in a communication processing system described in the application of G. R. Babecki et al, Ser. No. 393,111 filed June 28, 1982. The communication processing system in accordance with the Babecki et al disclosure comprises a plurality of nodes communicating by way of a common carrier communication system. Each node contains a plurality of communication processors and a data base processor, all such processors being interconnected by way of a data bus. Each of the processors have interfacing capability to deliver data communications to the bus and thus act as a source entity and to accept data communication from the bus and thus act as a destination entity. In a communication processing system of this type, it is important to insure that these various processors are capable of interchanging data communication in order to preserve the overall capability of the communication processing system. It is a broad object of the present invention to provide a data bus system which insures delivery of data communications.

It is well known to provide redundant bus systems to insure delivery of data communications. In one type of redundant systems, two or more bus systems are provided wherein each of the bus systems might normally provide all or a portion of the deliveries and the other bus system is on standby, prepared to handle the deliveries in the event that the "active" bus system should fail to deliver data communications due, for example, to a failure of a bus system component or input/output equipment interfacing the bus system. In such an event, the standby bus would "take over" and thereafter provide the communication deliveries normally provided by the failed bus system ( in addition to the deliveries that the standby might normally provide). These redundant systems require that each "standby" bus or buses carry all its own normal traffic and all of the traffic normally carried by the "failed" bus. In the event of such failure, the additional traffic might overburden the resources of the standby bus. It is therefore an object of this invention to reduce the additional traffic carrying capacity requirements imposed on the standby bus when the "active" bus "fails" in a redundant bus system.

SUMMARY OF THE INVENTION

A bus failure to deliver a data communication from a source entity to a destination entity might be due to a component which is not involved in deliveries between other source and destination entities. This has led to the realization that there is a separate logical path on each bus between each source and each destination. Accordingly, even though a delivery from one source to one destination over the "active" bus fails, subsequent deliveries to other destinations or by other sources may still be directed over this original active bus.

In the specific embodiment of this invention described hereinafter, a separate logical path extending from a source to each of the destinations over each bus is designated or identified in a table and each such designation is "marked" in accordance with success or failure of delivering communications over the logical path. Buses are selected, for delivering communications to each destination, in accordance with such markings of the designations of the logical paths extending to the destination and independent of markings of other logical path designations whereby a failure of a communication over a bus does not terminate future traffic on that bus between other entities. Since the "failed" bus can still accommodate traffic on other logical paths, the standby bus will not be overburdened by the failure.

The foregoing and other objects and features of this invention will be more fully understood from the following description of an illustrative embodiment thereof taken in conjunction with the accompanying drawings.

DETAILED DESCRIPTION

Figure 1:
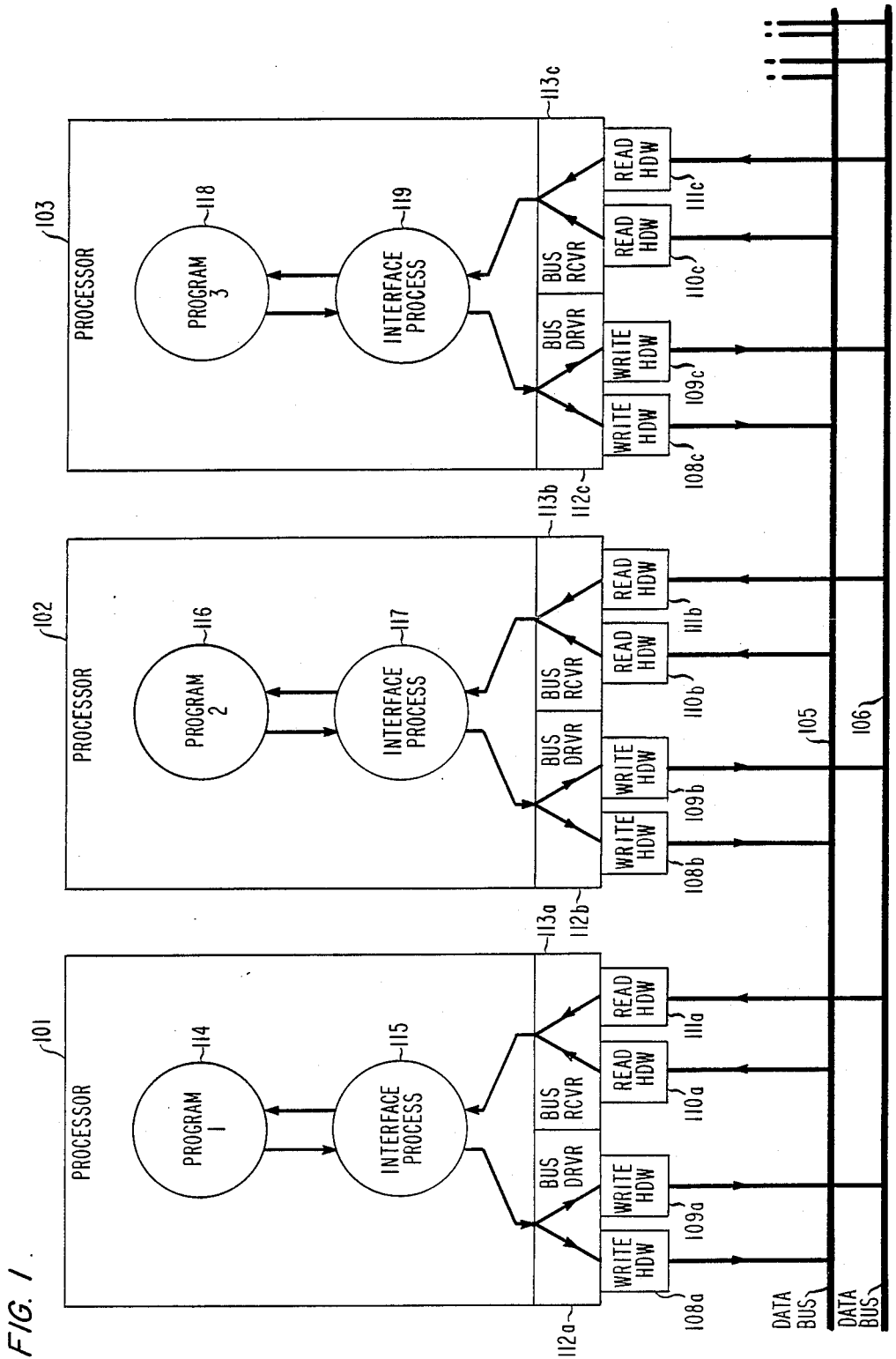
FIG. 1 shows in block form a redundant bus system arranged to deliver data communications in accordance with this invention.

The present invention is advantageously utilized in a bus communication system which might constitute a portion of a distributed multiprocessor communication system of the type disclosed in detail in the Babecki et al application. As disclosed in the Babecki et al application, each node of the multiprocessor communications system includes a plurality of processors which are capable of communicating with each other by way of a bus system. The processors that are capable of such intercommunication are symbolically represented in FIG. 1 of this application by processors 101, 102 and 103. Although three processors are depicted herein, additional processors can be similarly arranged to communicate with processors 101–103. As discussed in the Babecki et al application, each processor may advantageously comprise a VAX 11/780 machine offered by Digital Equipment Corporation of Maynard, Mass., supplemented by the VMS software operating system also offered by Digital Equipment Corporation.

The processors 101–103 are interconnected for communication purposes by data bus 105 and data bus 106 which are redundant buses that may individually and alternatively be utilized for the intercommunication. Associated with and physically controlling data bus 105 are write hardwares 108a, 108b and 108c. Write hardware 108a is connected to processor 101 and writes data onto bus 105 in accordance with data information provided by processor 101. Write hardware 108b and 108c function in the same manner and correspondingly write data information onto bus 105 in accordance with information provided by processors 102 and 103, respectively. Read hardwares 110a–110c are also associated with bus 105 and function to read data off bus 105 for application to processors 101–103, respectively. In a corresponding manner, write hardwares 109a–109c are associated with and physically control bus 106 and write data provided by processors 101–103, respectively, onto bus 106 and read hardwares 111a–111c are also associated with bus 106 and read data off bus 106 for application to processors 101–103, respectively. Each of the above-described buses 105 and 106 and the associated write and read hardwares constitute a bus system which is well known for conveying data from one device to another.

An advantageous bus system of the above-described type constitutes the PCL 11-B bus system offered by Digital Equipment Corporation. In the PCL 11-B bus system, the data bus, as symbolically represented in FIG. 1, shall be data bus 105 or 106, and constitutes three sets of leads; namely, address leads, data leads and control leads. In addition, the PCL 11-B bus system includes a master controller that allocates each source or sender (as exemplified by each of the read hardwares in FIG. 1) and a time slice or slot on the bus for communicating with any particular one of the destination readers or receivers on the bus (as exemplified by each of the read hardwares in FIG. 1). Each time slice is divided into four phases. During phase 1, the master controller selects the sender which will communicate during the time slice. In phase 2, if the sender has data it wishes to communicate, it applies an address to the address bus identifying the desired destination reader. At the same time, the sender applies a data word to the data leads of the bus. In phase 3, the various readers decode the address data on the address leads and the reader identified by the address word, upon recognizing its own address, proceeds to check the data word on the data leads for errors (such as parity errors). Thereafter in phase 4, the reader either accepts or rejects the data word, sets the control leads to designate whether it is accepting the data word or the data word is in error and the sender thereupon reads the response on the control leads to determine whether or not the communication with the reader has succeeded or failed.

As discussed in the Babecki et al application, each processor contains a plurality of processes working under the VMS operating system. Each such process may include a plurality of programs and routines which have the capability of communicating with each other or with programs or routines in other processes in the same processor or in the other processors connected to the interconnecting bus system. Examples of such processes, depicted in each processor, are identified as Interface Processes 115, 117 and 119 in processors 101, 102 and 103, respectively. Interface Process 115 interfaces bus driver routine 112a which, in turn, interfaces with write hardware 108a and 109b. In the reverse direction, read hardware 110a and 111a interface with bus receiver routine 113a which, in turn, interfaces with Interface Process 115. Similarly, Interface Processes 117 and 119 interface with bus driver routines 112b and 112c and they, in turn, interface with write hardware 108b and 109b and 108c and 109c. In the reverse direction, read hardwares 110b, 111b, 110c and 111c interface with bus receiver routines 113b and 113c and they, in turn, interface with Interface Processes 117 and 119.

Also shown in the processors are programs 114, 116 and 118. It is to be understood that each such program, such as program 114, may constitute a program in Interface Process 115 or may alternatively constitute a program in a process independent of Interface Process 115. In the latter case, as described in detail in the Babecki et al application, program 114, as part of the independent process, is capable of communicating with Interface Process 115 by way of an internal communication subsystem, which communication is by way of data bursts called information units (IUs). It is the function of program 114 as an originating end user desiring to communicate with a terminating end user, such as program 116 in processor 102 or program 118 in processor 103, to generate or develop data, to structure such data into the format of an information unit, to insert into the header portion of such information unit the network address of the terminating endpoint user (program) and to pass the IU by way of the internal communication subsystem to a program in another process, either directly or by way of an interface process such as Interface Process 115.

It is presumed that, prior to receiving the IU, Interface Process 115 allocates buffer space for storing such IU upon reception thereof. Accordingly, upon receiving the IU from the internal communication subsystem, Interface Process 115 stores the IU in the allocated buffer and obtains the network address of the terminating endpoint user from the IU header to thereby determine the identity of the destination processor which supports the terminating endpoint user program. Interface Process 115 also selects an appropriate one of the two data buses, utilizing information designating whether logical paths through the buses are delivering the data, as described in detail hereinafter, and issues a "write" command to bus driver routine 112a providing the address of the buffer storing the information unit, the destination processor identity, and the selected data bus identity as arguments.

Each bus driver routine, such as bus driver routine 112a, may constitute a portion of the Interface Process (115) or may alternatively be incorporated into the VMS operating system. When a write command is issued by Interface Process 115 to bus driver routine 112a, the bus driver uses the above-identified arguments to generate the bus address over the appropriate reader (associated with the destination processor) and pass this bus address to the appropriate write hardware (connected to the selected data bus). A data word from the IU stored in the buffer is also made available to the write hardware and the write hardware now proceeds to communicate with the designated read hardware during its allocated time slice, as described above. In the event that the data word is accepted by the read hardware, an associated acknowledgment is received by the write hardware, bus driver routine 112a is thus advised and the next word in the information unit is provided to the write hardware for passage to the read hardware of the destination processor. Alternatively, in the event that the read hardware does not accept the data word (and presuming that a subsequent repeated attempt also fails), a negative acknowledgment indicating failure of this communication is returned to bus driver 112a. Bus driver 112a will pass the negative acknowledgment back to Interface Process 115 in a manner described hereinafter.

Assume now that the information unit is destined for program 116 in processor 102, that a data word has been obtained from the IU, passed by way of the selected data bus and has been accepted by the destination read hardware. The read hardware passes the data word to bus receiver routine 113 and the receiver routine attempts to store the data word in buffer space previously allocated by Interface Process 117. In this manner, the various data words obtained from the IU stored in the buffer in processor 101 are assembled in the buffer in processor 102.

If the buffer space in processor 102 has been appropriately allocated and the IU is properly assembled into the buffer, an acknowledgment of successful delivery is returned by way of the bus to processor 101. If the IU is not fully and completely assembled in the buffer, a negative acknowledgment is returned. The acknowledgment is then received by bus driver routine 112a and passed back to Interface Process 115. Alternatively, if an acknowledgment is not received within a reasonable interval of time, it is presumed that the write was not successful and bus driver routine 112a passes a negative acknowledgment to Interface Process 115. A bus driver routine and a bus receiver routine suitable for use in this system is offered by Digital Equipment Corporation and described in further detail in Digital Computer Special Systems, PCL-11/VAX V2.0 I/O Driver's Guide, Document No. AA-K583A-TE, published by Digital Equipment Corporation, July 1981.

In processor 102, if the IU is successfully written to the buffer of Interface Process 117, the network address of terminating endpoint user program is obtained from the IU header. Interface Process 117, upon identifying program 116 as the terminating endpoint user, proceeds to forward the IU to the program by way of the internal communication subsystem. In processor 101, if a positive acknowledgment is returned to Interface Process 115 due to a successful delivery of an IU to the "read" Interface Process, the "write" is completed and Interface Process 115 retires. Alternatively, if the delivery is not successful and a negative acknowledgment is returned to Interface Process 115, the interface process will advise the internal communication subsystem that the IU was not successfully delivered through the bus system. In either event, whether the delivery through the selected bus to the designated "addressee" succeeds or fails, the "source" interface process, such as Interface Process 115, stores this information (in a table) and then utilizes this stored information to make subsequent selections of data buses for delivering subsequent communications. It is also noted that, when the internal communication subsystem is advised that the IU was not successfully delivered, it may advantageously request Interface Process 115 to resend the IU, in which event the Interface Process makes a new bus selection utilizing the updated information placed in the table due to the failure to deliver the IU on the first attempt and issues a new "write" command to bus driver 112a.

As noted above, the Interface Process of the source processor, such as Interface Process 115, selects the data bus that will carry the information unit. For this purpose, Interface Process 115 will select from the various "logical" paths through the bus system. More specifically, there is a separate logical path from write hardware 108a through bus 105 to each of the read hardwares on bus 105 and at the same time there is a separate logical path from write hardware 109a through bus 106 to each of the read hardwares on bus 106.

Figure 2:
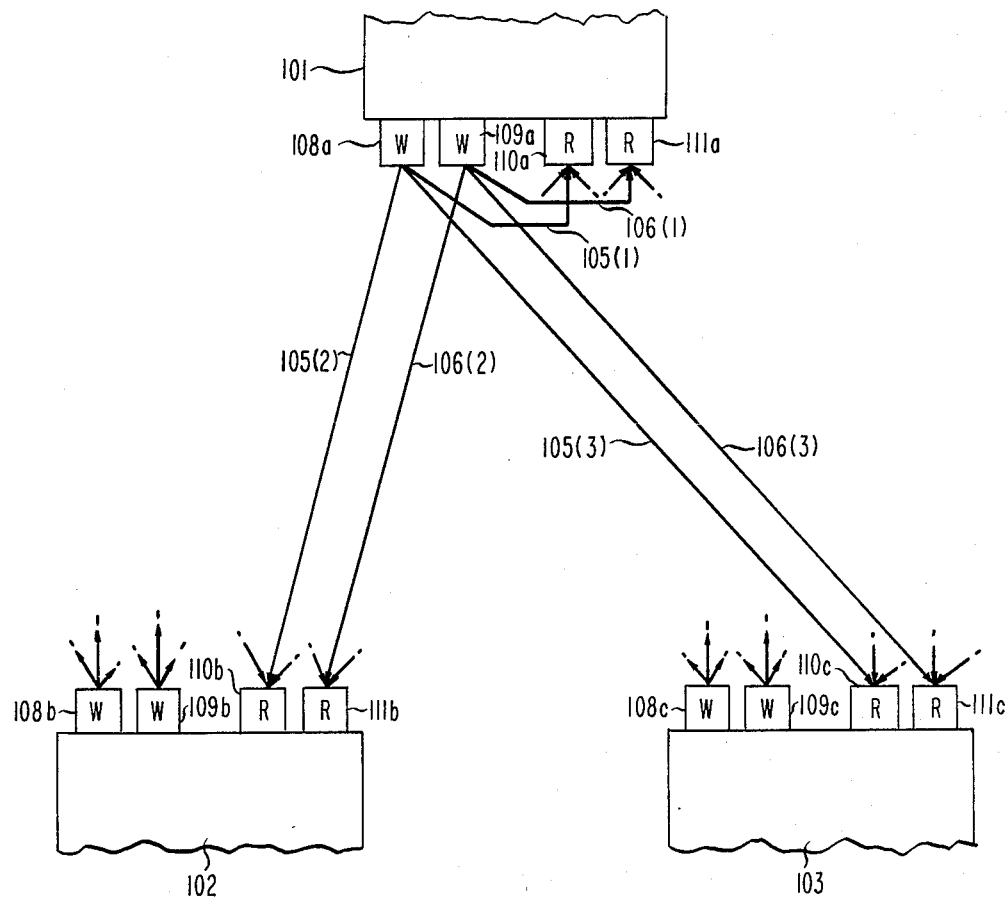
FIG. 2 depicts a representation of the logical paths that extend through the bus system.

The logical configuration of the bus system is shown in FIG. 2. In FIG. 2, the several processors and the write and read hardwares associated with the buses and connected to the processors are identified by the same numbers as the corresponding processors and hardwares in FIG. 1. An inspection of FIG. 2 discloses, that assuming that the bus system interconnects three processors, there are three logical paths emanating from write hardware 108a. These paths constitute path 105(1), which extends to read hardware 110a and represents a logical path through bus 105 to the read hardware connected to processor 101; path 105(2), which represents a logical path through bus 105 to read hardware 110b (which is connected to processor 102); and path 105(3), which represents a logical path to read hardware 110c (which is connected to processor 103). It is apparent that, for each reading device on bus 105, a separate logical path will extend from read hardware 108a through bus 105 to terminate in such reading device. Similarly, three logical paths extend from write hardware 109a through bus 106 to the read hardwares of the three processors, which three logical paths are identified as paths 106(1), 106(2) and 106(3) in FIG. 2. In the same manner, a separate logical path extends from the write hardware connected to each of the other processors to the read hardware connected to each processor.

It will be appreciated that if the transmission of an IU to the bus system does not result in a successful "write", the failure can be due to a number of causes. For example, a portion of the bus cable might fail, connection leads to and from the read and write hardwares might fail, the read or write hardwares might fail, or the failure may be on the part of some of the software in one or the other of the processors. It is apparent that some of these failures are local to or individual to a processor and do not result in the total termination of communication on that particular bus. In accordance with this invention, one or more of the interface processes, such as the Interface Process 115, identifies and records logical path successes and failures rather than bus successes and failures. It is also noted that logical paths connect the write and read hardwares of the same processors, a realization which is advantageously utilized, as described below.

For the purpose of identifying and recording the status of each of the logical paths through each of the buses, Interface Process 115 maintains a four column table. A representation of the table for Interface Process 115 suitable for the purpose of understanding the manner in which the process defines path status and accordingly determines bus selections is disclosed in the form of Table 1 below (it being understood that interface processes of other processors maintain corresponding tables):

TABLE 1

| Processor | Bus 105 | Bus 106 | Recommended Bus |
|---|---|---|---|
| 101 | G | G | 105 |
| 102 | Q | G | 106 |
| 103 | Q | Q | 106 |

The first column of Table 1 identifies each of the various destination processors to which a data word will be delivered. The second column is directed to bus 105 and identifies the status of each of the logical paths on bus 105 to each of the destination processors. Accordingly, the three rows in the column of bus 105 define the status of logical paths 105(1), 105(2) and 105(3). As described below, each status "marking" is determined from acknowledgments received in response to the sending of the data words to such associated destination processor. For the purpose of the table, a path status is marked "good" (G) or "questionable" (Q), depending upon whether or not the data words of an information unit have been successfully delivered to the destination processor. The third column is directed to bus 106 which correspondingly defines the status of the paths on bus 106 extending to the several destination processors (and therefore defines the status of logical paths 106(1), 106(2) and 106(3)). The fourth column stores the recommended bus for the delivery of the data words by processor 101 to the destination processor, which recommendation is provided as described in further detail hereinafter.

As noted above, Interface Process 115, when issuing a "write" command to bus driver 112a, selects the bus for the delivery of the data communication. For this selection, Interface Process 115 first identifies the recommended bus to the destination processor. Assuming the transmission is destined for processor 102, the recommended bus identified in Table 1 is bus 106 (and the recommended logical path is 106(2)). If the status for this bus is marked "good" (as shown in Table 1), bus 106 is selected by Interface Process 115 and the delivery of the communication proceeds in the manner described above. Alternatively, if the bus status is marked "questionable", Interface Process 115 proceeds in a round-robin fashion to select the next bus, which in this case would constitute bus 105. If this bus is marked "good", the information unit is delivered by write hardware 109a through bus 105 to processor 102. Alternatively, if all buses to processor 102 are marked "questionable", it is assumed that these troubles may be temporary, the bus system is not condemned, and Interface Process 115 will select "questionable" buses in a round-robin fashion. In any event, the bus to the destination processor (in this case processor 102) which is eventually selected than becomes the recommended bus for the next subsequent delivery to the destination processor.

The status markings in the table are updated by Interface Process 115 each time an acknowledgment is received from the destination processor which is inconsistent with the present status marked in the table. For example, assume that a delivery is directed to a destination processor, such as processor 102, the status of the logical path on the selected bus to such processor is marked "good" and a negative acknowledgment is received. When the negative acknowledgment is thus received by Interface Process 115, the process proceeds, in a conventional manner, to update the table by changing the logical path status from "good" to "questionable". Advantageously, at this time, the maintenance craftspeople are alerted to the failure to deliver the information unit, which craftspeople can now collect the information from the tables of the Interface Processes in the several processors to isolate which component is failing in the communication process.

Alternatively, if a logical path has been marked "questionable" and the Interface Process 115 has nevertheless selected the questionable logical path, and further if this attempt to write an IU to the destination processor succeeds, then the status for the logical path is changed from "questionable" to "good" in the table and any alarm conditions priorly raised are now removed.

Figure 3:
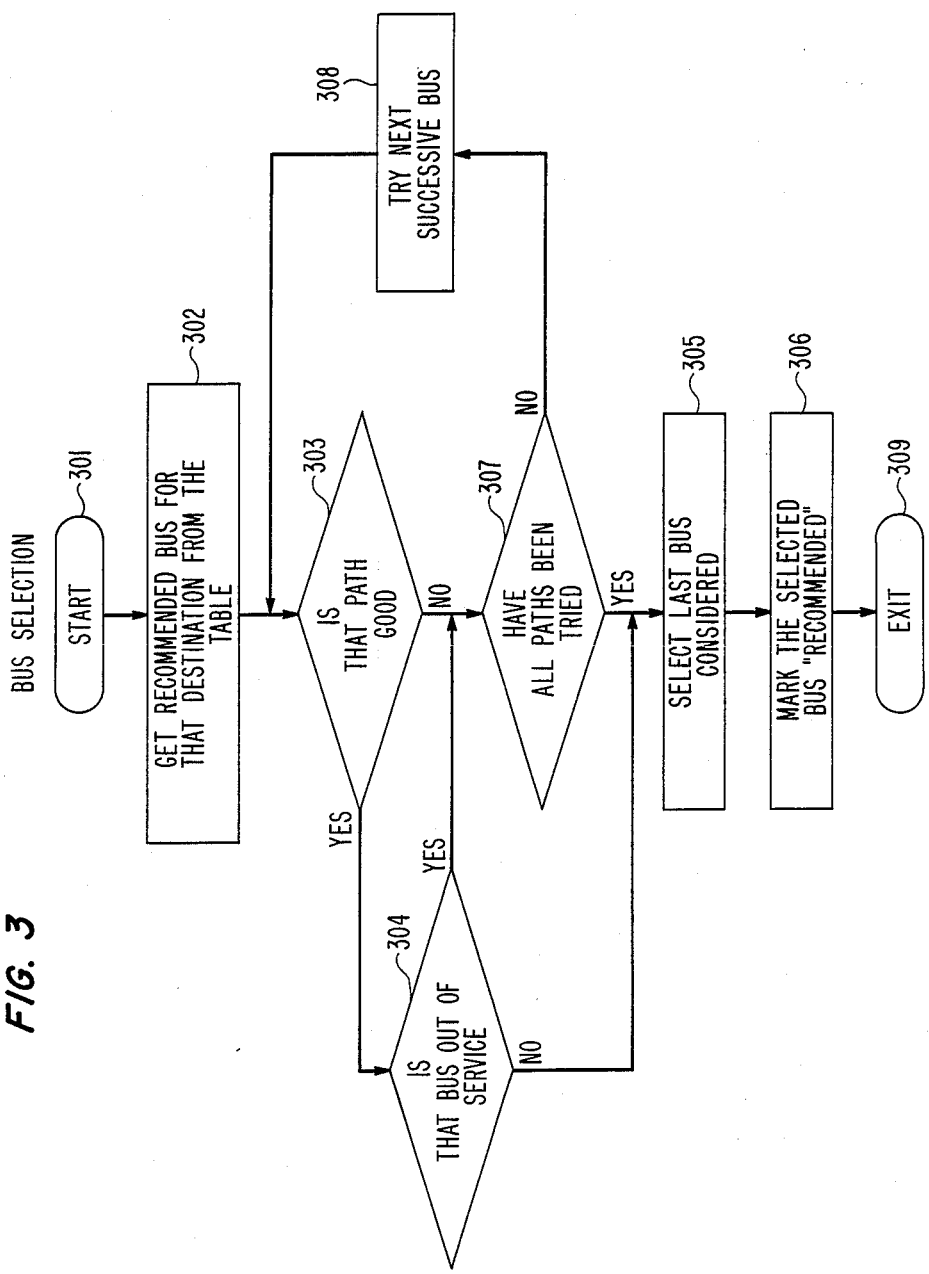
FIG. 3 discloses a flowchart of a routine for selecting an appropriate bus to deliver a data communication.

FIG. 3 depicts a flowchart of the routine provided by Interface Process 115 for selecting the appropriate bus to deliver a data communication utilizing the status markings in Table 1. It is recalled that the Interface Process such as Interface Process 115 receives each IU from the internal communication subsystem. It is further recalled that the Interface Process stores the IU in allocated buffer space and obtains the network address of the terminating endpoint user or program from the IU header to thereby determine the identity of the destination processor which supports the terminating endpoint user program. At this point, the Interface Process selects the bus which will deliver the data words obtained from the IU. In accordance therewith, Interface Process 115 invokes the bus selection subroutine, the flow diagram thereof being shown in FIG. 3. The subroutine, upon being invoked, advances from starting condition 301 to step 302. In step 302, the bus selection subroutine accesses the bus status table and obtains the identity of the recommended bus specified in the table for deliveries to the destination processor determined from the network address in the IU. The bus selection subroutine then advances to decision 303 to determine whether the logical path through the recommended bus is marked "good". For example, in Table 1, if the IU is destined for processor 102 and the recommended bus is identified as bus 106, decision 303 determines whether the logical path through bus 106 is marked "G". As seen in the Table 1 example, this logical path under the bus 106 column is marked "G" for the "processor 102" row. In that event, decision 303 advances the subroutine to decision 304.

In decision 304, it is determined whether or not the bus (in this case bus 106) is out of service. If the bus is in service, decision 304 advances the subroutine to step 305. In accordance with step 305, this bus last considered, namely, bus 106, is selected for the delivery of the data communication to processor 102. The subroutine then advances to step 306 where Interface Process 115 updates the table, marking the selected bus "recommended" by entering the identity of the bus under the "recommended bus" column. In this particular case, of course, bus 106 is presently "recommended" by the table and no change in the table is necessary. The subroutine thereupon advances to exit 309 and retires.

Assume now that decision 303 determines that the logical path through the recommended bus is not marked "good"; that is, the path is marked "questionable". This would be the situation in Table 1 where a data communication is directed to processor 103, the recommended bus constitutes bus 106 and the logical path to processor 103 on bus 106 is marked "questionable", as can be observed in row 3 of Table 1. In this event, since the logical path is marked "questionable", decision 303 advances the subroutine to decision 307. The subroutine in decision 307 determines whether or not, during this bus selection subroutine, the status of all of the logical paths to the destination processor have been examined to locate a "good" path. If at least one logical path status has not been examined (in this case the only other path to the destination processor constitutes the logical path through bus 105), decision 307 advances the subroutine to step 308. In step 308, the next successive bus is identified (in this case bus 105) and the subroutine advances back to decision 303 to determine if the status of the logical path to the destination processor through that next successive bus is "good". If the path is "good", decision 303 advances the subroutine to decision 304 and, if the bus is in service, decision 304 advances the subroutine to step 305 to select this "last considered" bus and, in step 306, to update the table by marking the selected bus "recommended". Alternatively, if the logical path through bus 105 is marked "questionable" (as in the case in row 3 of Table 1), decision 303 advances the subroutine back to decision 307. Since all logical paths to the destination processor have now been "tried", decision 307 advances the subroutine to step 305 to select this "last considered" bus even though the logical path therethrough has been marked "questionable". Step 306 then updates the table by marking this selected bus as "recommended".

If decision 303 determines that a logical path is marked "good" and advances the subroutine to decision 304 and if decision 304 determines that the bus supporting the logical path is out of service, the subroutine is then advanced to decision 307. As described above, decision 307 will now advance the subroutine to step 308 to try the next successive bus if all of the paths have not been tried and alternatively will advance the subroutine to step 305 if all of the paths have been tried. With the routine at step 305 or 308, if proceeds to provide the various functions in the manner described above.

Interface Process 115 is advantageously arranged to periodically poll each destination over each logical path to maintain the table updated. More specifically, Interface Process 115 will issue "write" commands to bus driver routine 112a providing the identities of the several buses that are in service and the various destination processors.

Figure 4:
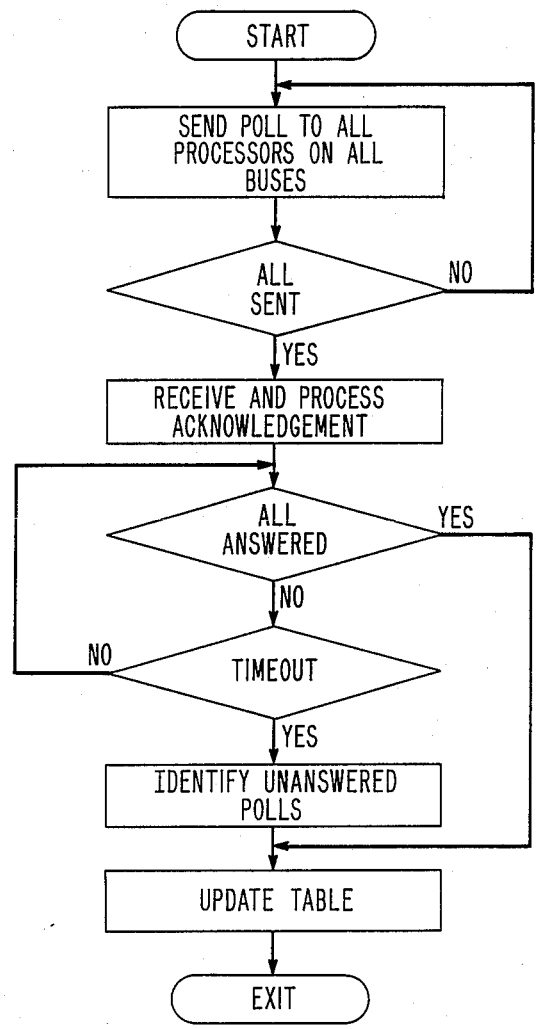
FIG. 4 discloses a flowchart of a routine for polling destinations over the bus system and updating the table in accordance with acknowledgements.

Bus driver 112a, in response thereto, directs poll words together with appropriate address code to all of the logical paths, in sequence, whereby read hardware of processor 101, as well as read hardware of processors 102 and 103, are polled. Acknowledgments are then returned, permitting Interface Process 115 to update its table, including updating the status of logical paths back to processor 101. A readout of the table provides information relative to all logical paths, enabling craftspeople to isolate specific component failure in the bus system. A flowchart for a routine in Interface Process 115 for polling each destination and updating the table in accordance with the success or failure of each destination returning an acknowledgment is depicted in FIG. 4.

Although a specific embodiment of this invention has been shown and described, it will be understood that various modifications may be made without departing from the spirit of this invention.

What is claimed is:

1. in a communication system having a communicating source entity, at least two communicating destination entities and at least two buses, each bus interconnecting in parallel the three communicating entities for delivering data communications from the source to the destination entities, a method for enabling the source entity to select buses to deliver the data communications, comprising the steps of:

directing an initial communication to be delivered to any one of the destination entities over only a selected one of the buses; and directing subsequent communications to be delivered to the one destination entity over only another one of the buses while still directing subsequent communications to be delivered to other ones of the destination entities only over the selected one bus when delivery of the initial communication fails.

2. In a communication system in accordance with claim 1 wherein the step of directing subsequent communication includes the steps of:

designating separate logical paths over the one bus, each of the logical paths extending to a corresponding one of the destination entities;

marking a logical path destination when delivery of a communication to the corresponding entity fails; and directing subsequent communications to the corresponding entity over another bus when the logical path is marked.

3. A method for delivering data communications to destinations in a communication system having at least two destinations and at least two buses, each bus extending in parallel, to all the destinations for delivering data communications to the destinations, comprising the steps of:

designating separate logical paths individually extending to each destination over each individual bus;

determining markings for each logical path designation in accordance with the success of delivering a first communication to the individual destination over the individual bus; and directing subsequent communications to each destination over a bus selected in accordance with the markings, determined for said first communication, of the designations of the logical paths extending thereto and independent of the markings of the designations of the logical paths extending to other destinations.

4. A method for delivering data communications in accordance with claim 3 wherein the step of determining markings for each logical path designation includes the steps of marking the path designation in one manner when the delivery of the communication is successful and marking the path designation in another manner when the delivery of the communication fails.

5. A method for delivering data communications in accordance with claim 4 wherein the step of directing subsequent communications includes the step of selecting one of the buses when the designation of the path extending over the one bus is marked in the one manner.

6. A method for delivering data communications in accordance with claim 5 wherein the step of directing subsequent communications further includes the step of selecting another one of the buses when the designation of the path extending over the one bus is marked in the other manner.

7. A method for delivering data communications in accordance with claim 4 wherein the step of directing subsequent communication includes the step of selecting successive ones of the buses for delivering successive ones of the subsequent communications to each designation when the designations of all of the paths extending to the destination are marked in the other manner.

* * * * *